W. D. REEVES.
CANDY TWISTING MACHINE.
APPLICATION FILED JULY 31, 1908.

942,284.

Patented Dec. 7, 1909.

Witnesses

Inventor
William Dalton Reeves
by
Foster, Freeman, Watson & Coit
Attorneys

UNITED STATES PATENT OFFICE.

WILLIAM DALTON REEVES, OF ATLANTA, GEORGIA.

CANDY-TWISTING MACHINE.

942,284.

Specification of Letters Patent.

Patented Dec. 7, 1909.

Application filed July 31, 1908. Serial No. 446,353.

*To all whom it may concern:*

Be it known that I, WILLIAM DALTON REEVES, a citizen of the United States, and residing at Atlanta, in the county of Fulton and State of Georgia, have invented certain new and useful Improvements in Candy-Twisting Machines, of which the following is a specification.

This invention relates to candy making machines, and particularly to machines for forming and twisting stick candy. Its objects are to simplify and improve the construction of such machines and to produce a device which will more efficiently twist the candy than those in common use.

The novel features and advantages of the device will be understood from the following description taken in connection with the accompanying drawings.

Figure 1:
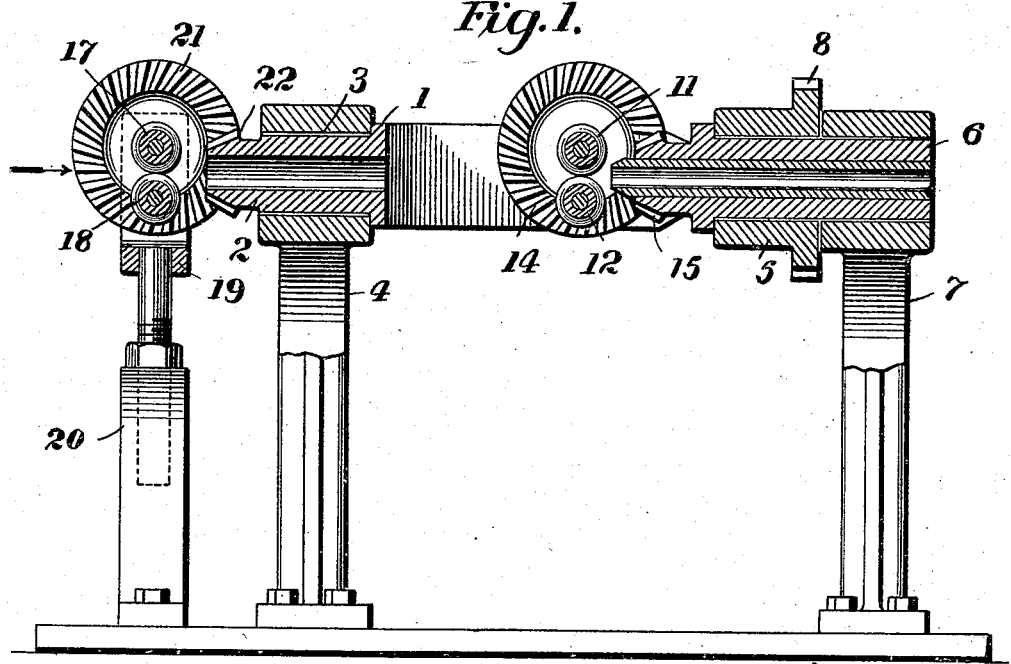
Figure 2:
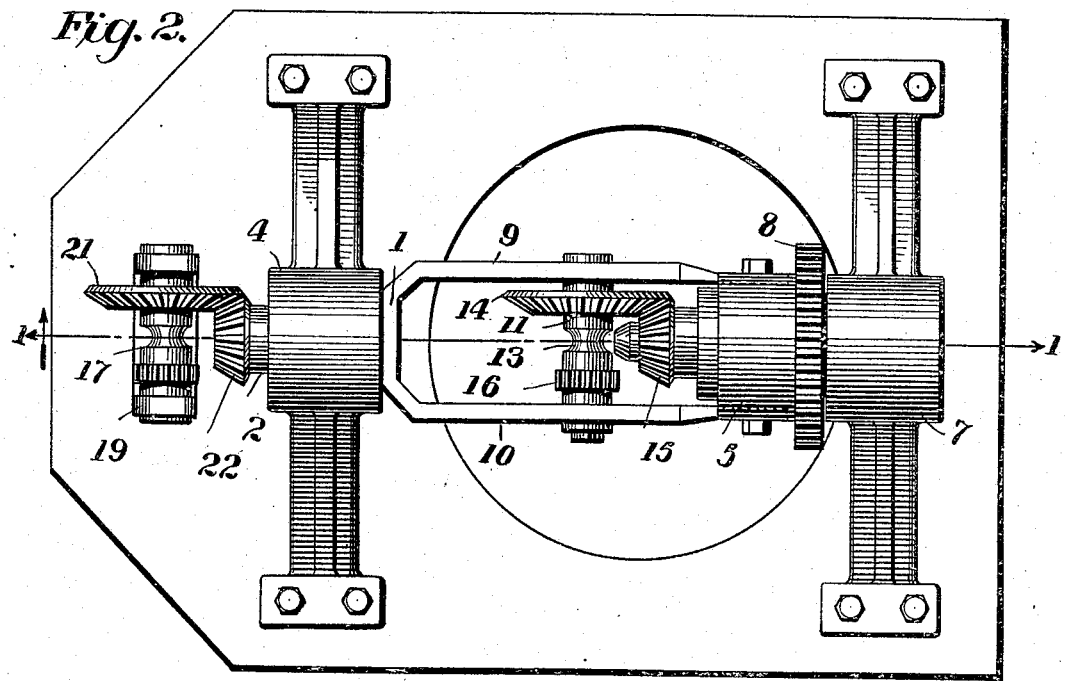

In the drawings, Figure 1 is a longitudinal section of the essential features of my invention; and Fig. 2 is a plan view.

My invention embodies a rotary member mounted in bearings and including a rotary candy receiving tube in line with two grooved transverse rollers which turn bodily with the rotary member and at the same time rotate upon their own axes, thus feeding forward the candy supplied to them from the rotary tube. There is a stationary discharge tube which receives the candy from these rollers and there are two grooved feed rollers on this machine in advance of the rotary candy receiving tube.

In the drawings 1 represents the rotary member of my candy twisting machine, and it will be observed that it embodies the tube 2 mounted in the bearing 3 in the stationary spider frame 4, and that it also embodies at its other end a sleeve bearing 5 which is adapted to rotate on the stationary tube 6 mounted in the spider frame 7. The sleeve 5 is provided with the gear teeth 8 which are adapted to be engaged by gear teeth upon any suitable driving mechanism whereby the member 1 will be rotated. The tube 2 and the sleeve 5 are connected by the flat side bars 9 and 10, and two transverse feed rollers 11 and 12 are mounted upon these side bars, these rollers being provided with meeting grooves 13 which make a circular passage between them. The roller 11 rotates upon bearings secured to the side bar 9 and this roller is provided with the bevel gear 14 which is in a position to engage the bevel gear 15 upon the end of the stationary tube 6. The roller 12 is mounted upon bearings secured to the side bar 10 and the rollers 11 and 12 have intermeshing gears 16 which make them rotate together in opposite directions. Since the roller 11 is mounted in the center of the bevel gear 14 and since the candy receiving tube 6 must be in line with the opening formed by the grooves in the rollers 11 and 12 it is necessary for the tube 6 to be at one side of the center of the bevel gear 14, and thus the bevel gear 15 must engage the gear eccentrically. To this end the teeth on the gear 14 are not made radial, but are placed at an angle.

In advance of the rotary tube 2 I place the grooved feed rollers 17, 18 mounted in the forked upper end 19 of the adjustable support 20. These rollers and the bevel gear 21 secured to the roller 17 are similar to the rollers 11, 12 and the gear 14. The gear 21 engages eccentrically the bevel gear 22 on the end of the rotary tube 2, and by this means the rollers are turned upon their own axes as the tube 2 is rotated. It will be understood that these rollers are mounted upon stationary bearings and have no motion except a rotary motion upon their axes.

It will be understood from the above description that the candy is fed by any suitable means known in the art to the rollers 17 and 18 as indicated by the arrow in Fig. 1, and that the candy pressed between these rollers in stick form enters the rotary tube 2 which serves to twist it. When the candy leaves the tube 2 it passes between the rollers 11 and 12 which rollers serve to feed it forward, and which by reason of their bodily rotation with the member 1, serve also to twist it. From these rollers the candy passes through the stationary tube 6 and is discharged. The power for operating the machine is supplied through the gear 8 and is transmitted to the feed rollers by the bevel gears as above indicated.

Having thus described the invention, what is claimed is:

1. In a candy making machine, the combination with a stationary candy receiving tube, of a rotary candy receiving tube in line therewith, intermediate transverse grooved rollers mounted to move bodily with said rotary tube, gearing connecting said rollers with the stationary tube whereby they rotate upon their own axes as they turn, grooved feed rollers in advance of the end of said rotary tube mounted upon stationary bearings, and gearing connection between said rollers and tube whereby they are rotated upon their axes as the tube is turned.

2. In a candy making machine, the combination with grooved feed rollers, of a rotary member having a tubular portion adjacent and in line with said feed rollers and having a bifurcated portion carrying grooved feed rollers in line with said tubular portion, a stationary discharge tube in line with said last mentioned rollers, rotary bearing connection between said stationary tube and rotary member, and gearing connection between said stationary tube and feed rollers whereby the rollers are rotated on their axes when the frame is turned.

3. In a candy making machine, the combination with a rotary member embodying a tubular candy receiving portion at one end, a tubular portion at the other end having an interior bearing surface and an intermediate connecting frame, of a stationary candy receiving tube in line with the candy receiving portion and upon which the bearing surface of said tubular portion fits, transverse shafts in said frame upon opposite sides of the central line of the member, grooved rollers having intermeshing gears on said shafts and bevel gears connecting one of said rollers with the end of said stationary tube.

4. In a candy making machine, the combination with a rotary member, embodying a tubular candy receiving portion at one end, a tubular portion at the other end having an interior bearing surface, and an intermediate connecting frame, of a stationary candy receiving tube in line with the candy receiving portion and upon which the bearing surface of said tubular portion fits, transverse shafts in said frame upon opposite sides of the central line of the member, grooved rollers having intermeshing gears on said shafts, a bevel gear upon the end of said stationary tube, and a bevel gear making eccentric engagement therewith mounted on one of said shafts and secured to the roller thereon.

5. In a candy making machine, the combination with a stationary candy receiving tube, of a rotary member in line with said tube, grooved rollers mounted transversely in said member, the meeting edges of said rollers being in line with said tube, gears connecting said rollers whereby they move together, a bevel gear upon the end of said stationary tube, and a bevel gear upon one of said rollers making eccentric engagement with the gear on said tube.

6. In a candy making machine, the combination of grooved feed rollers mounted on stationary bearings, of a rotary tube in line with said rollers and adapted to receive the candy therefrom, grooved feed rollers in line with said tube adapted to revolve upon their own axes and the axes of which are adapted to turn bodily in a plane at right angles to the direction of feed of the candy, and a stationary discharge tube adapted to receive the candy from the last mentioned rollers.

7. In a candy making machine the combination with a stationary candy receiving tube, of a rotary candy receiving tube in line therewith, intermediate transverse rollers mounted to move bodily with said rotary tube, the meeting edges of said rollers being in line with said tube, and bevel gears connecting said rollers with the stationary tube whereby they rotate upon their own axes as they turn.

In testimony whereof I affix my signature in presence of two witnesses.

WILLIAM DALTON REEVES.

Witnesses:
K. J. STORER,
J. J. HUSTINGS.